Figure 1:
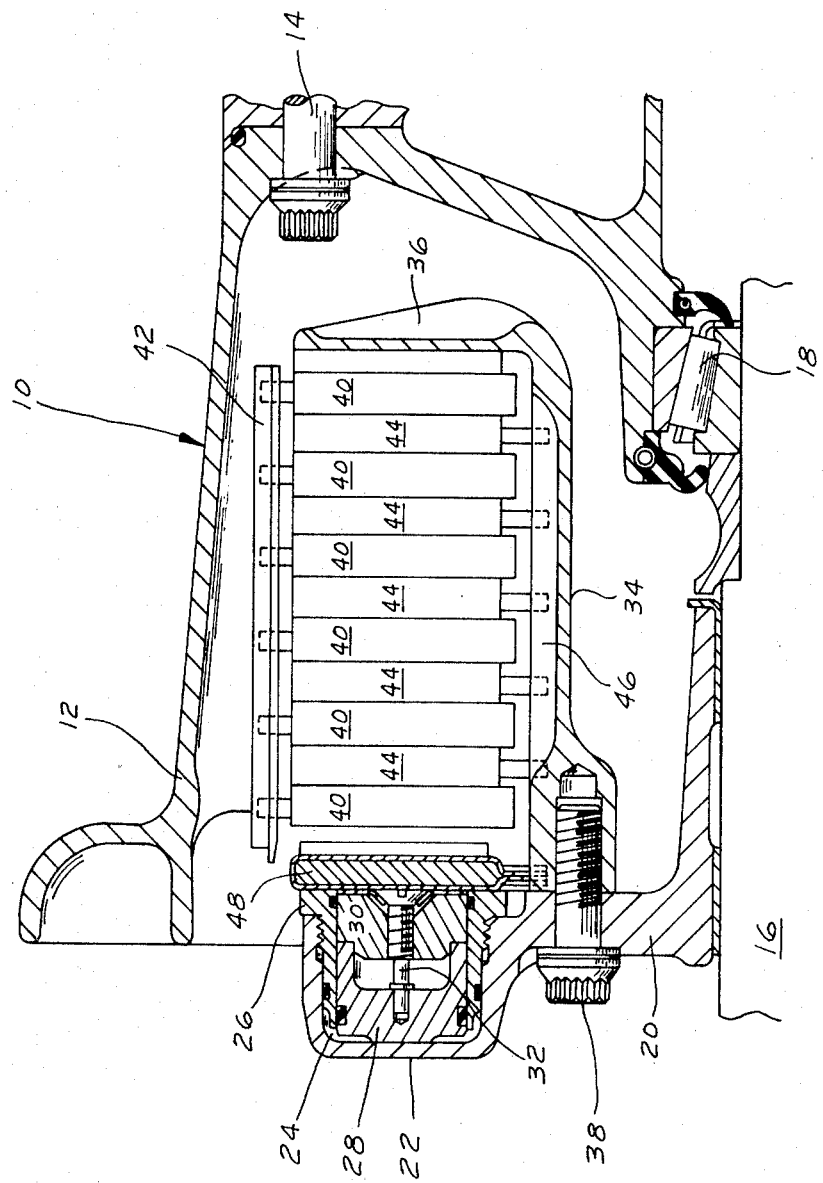

United States Patent [19]

Stout

[11] 3,747,712

[45] July 24, 1973

[54] FRICTION DISC FOR DISC BRAKE

[75] Inventor: Gilbert T. Stout, South Bend, Ind.

[73] Assignee: The Bendix Corporation

[22] Filed: Sept. 20, 1971

[21] Appl. No.: 181,778

[52] U.S. Cl. ...... 188/73.2, 188/218 XL, 192/107 R
[51] Int. Cl. ............................................ F16d 65/12
[58] Field of Search ................. 188/218 A, 218 XL, 188/251 A, 23.2; 192/107 M, 107 R

[56] References Cited

UNITED STATES PATENTS

| | | | |
|---|---|---|---|
| 3,507,370 | 4/1970 | Falch | 188/218 XL |
| 2,485,082 | 10/1949 | Bachman | 188/218 XL |
| 3,473,637 | 10/1969 | Rutt | 192/107 R |

FOREIGN PATENTS OR APPLICATIONS

| | | | |
|---|---|---|---|
| 1,151,276 | 7/1963 | Germany | 188/218 XL |
| 848,029 | 9/1960 | Great Britain | 188/218 A |

*Primary Examiner*—George E. A. Halvosa
*Attorney*—Gordon H. Chenez et al.

[57] ABSTRACT

A friction disc such as a disc brake rotor having an annular core of material such as carbon or the like providing sliding frictional resistance and a heat sink for heat generated thereby. A retaining metal ring encircling the annular core is provided with circumferentially spaced-apart key slots adapted to engage drive keys suitably mounted to a wheel. A plurality of circumferentially spaced-apart radially extending openings in the retaining ring are adapted to receive associated drive pins or rods which extend therefrom through radially extending passages in the annular carbon core. Braking torque loads generated by the annular carbon core which bears against the drive pins are transmitted by the latter to the retaining ring which, in turn, bears against the drive keys.

5 Claims, 5 Drawing Figures

INVENTOR.
GILBERT T. STOUT

INVENTOR.
GILBERT T. STOUT

FRICTION DISC FOR DISC BRAKE

BACKGROUND OF THE INVENTION

In disc brakes and multiple disc high capacity aircraft brakes, in particular, various materials such as carbon, berrylium, etc., have been substituted for conventional steel rotors and/or stators in an attempt to improve the brake efficiency and life under adverse conditions such as extreme heat and temperature experienced in braking large heavy aircraft as, for example, jet aircraft which land at relatively high speed. The substitution of carbon, berrylium, etc. for steel has shown a marked improvement in the ability of the brake rotors and/or stators to function efficiently with reduced maintenance problems and relatively longer life under the most adverse braking requirements. However, a significant disadvantage of such materials, for example, carbon, is the characteristically low strength thereof in tension and/or shear modes which requires careful consideration of the manner in which brake torque loads are imposed thereon if structural failure is to be avoided. A carbon rotor or stator has satisfactory strength in a compression mode thereby enabling it to withstand the brake loads providing the load is not localized. Various rotor and/or stator disc structures have been proposed wherein a carbon core, either one piece or segmented, is carried by a metal frame or retaining member which, in turn, is suitably keyed to a wheel in the case of a rotor or to a fixed torque absorbing member in the case of a stator. Reference is made to U.S. Pat. No. 3,403,759 issued Oct. 1, 1968 in the name of O. L. Holcomb, Jr., U.S. Pat. No. 3,483,953 issued Dec. 16, 1969 in the name of John R. Bender and U.S. Pat. No. 3,548,979 issued Dec. 22, 1970 in the name of John P. Nelson et al for examples of such prior art. However, such prior art rotor and/or stator structures are not entirely satisfactory from the standpoint of structural complexity and associated fabrication costs, maintenance problems and weight among other disadvantages as will be recognized by those persons skilled in the art.

In summary, the present invention provides a rotor disc wherein an annular carbon friction disc is subjected to compressive force as a result of bearing against a plurality of circumferentially spaced-apart rods or pins extending radially therethrough which rods or pins are secured to a metal retaining ring encircling the carbon disc and provided with circumferentially spaced-apart recesses adapted to mate with associated drive keys fixedly secured to a wheel.

It is an object of the present invention to provide a simple and structurally strong friction disc including an annular carbon member.

Referring to FIG. 1, there is shown an aircraft wheel and brake assembly of the multiple disc type. The wheel 10 may be formed of two half portions only one of which designated by 12 is shown. A plurality of bolts 14, only one of which is visible, fixedly secure the two half portions together. The wheel 10 is rotatably mounted on a fixed stub-axle 16 forming part of the aircraft landing gear, not shown, by conventional bearing means 18. A non-rotatable annular carrier member 20 secured to axle 16 by conventional fastening means, not shown, is provided with a plurality of fluid pressure actuated motors 22 each of which includes a chamber 24 adapted to receive a sleeve 26 threadedly engaged with carrier member 20. A piston 28 slidably carried in sleeve 26 is provided with a block of heat insulation material 30 fixedly secured thereto by suitable fastening means such as a bolt 32. The piston 28 is actuated by pressurized fluid supplied to chamber 24 via a conventional fluid distributing system, now shown, including brake fluid pressure control means controlled by the aircraft pilot.

A torque tube 34 including an annular backing plate 36 is fixedly secured to carrier member 20 by a plurality of spaced-apart bolts 38 only one of which is shown.

A plurality of axially spaced-apart annular rotor discs 40 are suitably splined for axial movement along a mating key member 42 fixedly secured to wheel 10. A plurality of annular stator discs 44 interleaved with rotor discs 40 are suitably splined for axial movement along a mating key member 46 fixedly secured to torque tube 34.

The rotor discs 40 and stator discs 44 are frictionally engaged when compressed together between backing plate 36 and an annular pressure plate 48. The pressure plate 48 suitably splined to torque tube 34 for axial movement thereon is actuated by motors 22 engageable therewith. It will be recognized that frictional engagement of the rotor and stator discs 40 and 44 results in a corresponding brake torque resistance to rotation of wheel 10 which brake torque is absorbed by non-rotatable torque tube 34.

Figure 3:
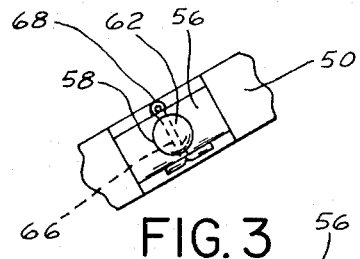
Figure 2:
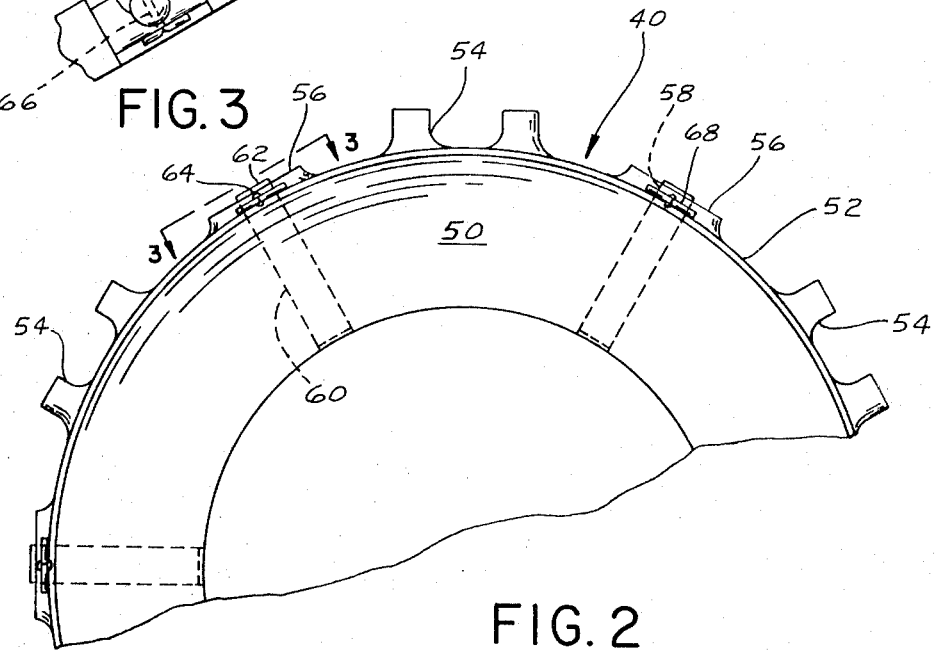

Referring to FIGS. 2 and 3, a rotor disc 40 includes an annular carbon core 50 which is encircled by a metal ring 52 having circumferentially spaced-apart key engaging slots or recesses 54 formed therein. Intermediate slots 54 the ring 52 is provided with a reduced width boss portion 56 and a radially extending opening 58 formed in the boss portion 56. The opening 58 is aligned with an opening or bore 60 formed in carbon core 50 and extending radially therethrough. A metal rod or pin 62 slidably received by opening 58 extends radially inwardly therefrom into opening 60 with a relatively loose fit with the latter. Diametrically opposed openings 64 in boss portion 56 are aligned with a diametrical passage 66 in pin 62 to permit insertion of a fastening member such as cotter pin 68 to retain pin 62 in position. It will be noted that sufficient clearance is provided by the reduced width of boss portion 56 to accommodate the head and tang portions of cotter pin 68 which do not extend beyond the associated opposite friction surfaces of core 50.

Figure 5:
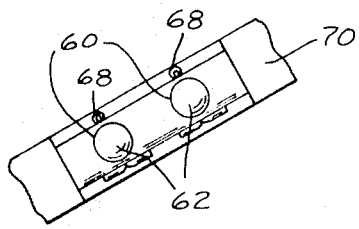
Figure 4:
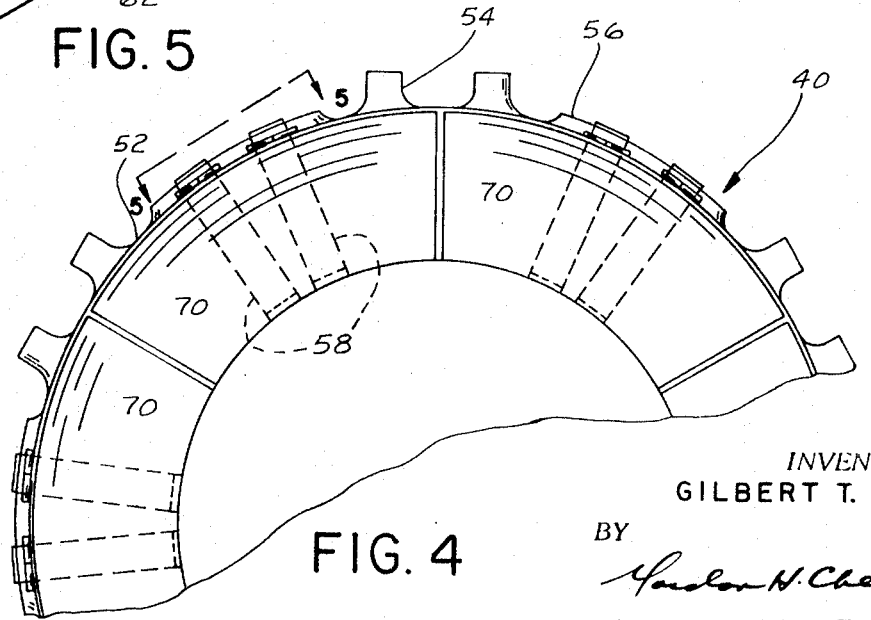

Referring to FIGS. 4 and 5, the rotor disc 40 is shown with a segmented carbon core in which case a plurality of carbon segments 70 are arranged to form a substantially continuous annular carbon core. Each boss portion 56 is lengthened circumferentially to accommodate two openings 58 having a spaced-apart relationship. A carbon segment 70 is provided with two spaced-apart radially extending openings 60 which receive associated rods or pins 62 extending from openings 58. As in the case of FIG. 2, cotter pins 68 serve to secure pins 62 in position on ring 52.

It will be assumed that the pistons 28 are energized by pressurized fluid in chamber 24 to compress the rotor and stator discs 40 and 44 together between pressure plate 48 and backing plate 36 thereby creating frictional resistance and thus braking torque tending to resist rotation of rotor discs 40 and thus wheel 10 connected thereto by virtue of the force transmitting metal pins 62 and ring 52. To that end, the carbon core 50 is caused to bear against pins 62 each of which engages the adjacent wall of associated opening 60 with the highest bearing force load distributed longitudinally thereagainst at the mid section of core 50 or in other words, along the line of contact between pin 62 and adjacent wall. The resulting tangentially directed bearing load against carbon core 50 produces a corresponding compressive stress in core 50 which as pointed out heretofore is the most favorable strength characteristic of the carbon material.

It will be recognized that the carbon material is compressible to a limited extent thereby permitting the effective bearing area between pin 62 and adjacent wall of opening 60 to increase as the bearing load therebetween increases until maximum bearing area is established. Preferably, the clearance between pin 62 and wall of opening 60 is held to a minimum to avoid an interference fit between pin 62 and opening 60 and yet compensate for differential thermal expansion between pin 62 and carbon core 50.

As the effective bearing area increases in the above-mentioned manner the force per unit area imposed on the wall of opening 60 progressively decreases from the mid section of core 50 to the opposite friction surfaces thereof thereby establishing a corresponding reduction in stress in the region of the friction surfaces of core 50.

Referring to FIGS. 4 and 5, the braking torque derived from the segments 70 is transmitted via pins 62 and ring 52 to wheel 10 in the same manner as described above with regard to FIGS. 2 and 3. However, the use of two pins 62 in each segment 70, which pins 62 extend radially through the segment 70, tends to restrain segment 70 against radially inwardly movement relative to ring 52 as well as reduce the effective bearing load imposed against segment 70 in comparison to that experienced by a single pin 62 arrangement.

It will be understood that the present invention is not restricted to use in connection with a rotor disc but, as will be recognized by those persons skilled in the art, is adaptable to use in a stator disc.

I claim:

1. A friction disc for a multiple disc brake for retarding rotation of a wheel member mounted on a fixed axle member, said friction disc comprising:
   an annular friction member defined by a plurality of arcuate segments arranged end to end formed of relatively brittle friction material characterized by strength weakest in tension and shear modes;
   a retaining ring concentric with said annular member and abutting one of the circumferential edges thereof;
   a plurality of circumferentially spaced-apart radially extending openings in said retaining ring;
   a plurality of circumferentially spaced-apart radially extending bores or openings in said annular member at least two bores being provided in each segment;
   a pin retained at one end by each of said pluraity of openings and extending therefrom into an associated one of said bores; and key means operatively connecting said retain-ing ring to one of said wheel and axle members and permitting axial movement of said retaining ring relative to said wheel and axle members.

2. A friction disc as claimed in claim 1 wherein:
said pins are removably secured to said ring by fastening means extending transversely therethrough.

3. A friction disc as claimed in claim wherein:
said retaining ring is engageable with the radially outward edge of said annular member; and
said key means includes a plurality of circumferentially spaced-apart axially extending key members operatively connected to said wheel member and said retaining ring.

4. A friction disc as claimed in claim 1 wherein:
said pins are slidably received by said bores with a non-interference fit therebetween.

5. A friction disc as claimed in Claim 1 wherein: said key means includes circumferentially spaced-apart axially extending key members operatively connected to said retaining ring intermediate said openings therein.

* * * * *